Nov. 29, 1955     J. M. GWINN, JR     2,725,152
ELEVATING TAIL GATE FOR VEHICLES
Filed Sept. 13, 1951     5 Sheets-Sheet 1
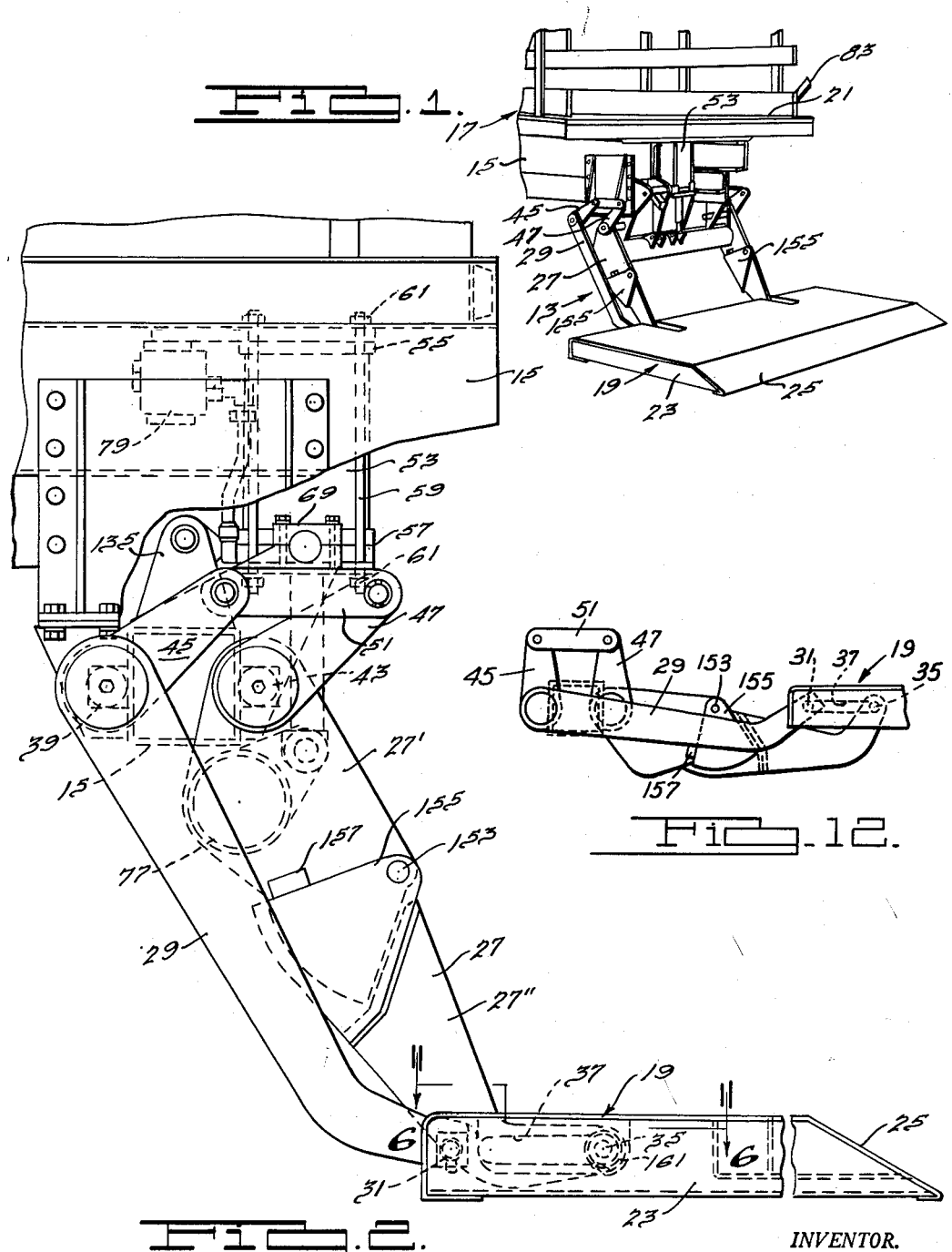
INVENTOR.
Joseph M. Gwinn, Jr.
BY
Harness, Dickey & Pierce
ATTORNEYS.

Nov. 29, 1955     J. M. GWINN, JR     2,725,152
ELEVATING TAIL GATE FOR VEHICLES

Filed Sept. 13, 1951     5 Sheets-Sheet 2

INVENTOR.
Joseph M. Gwinn, Jr.
BY
Harness, Dickey & Pierce
ATTORNEYS

Nov. 29, 1955  J. M. GWINN, JR  2,725,152
ELEVATING TAIL GATE FOR VEHICLES
Filed Sept. 13, 1951  5 Sheets-Sheet 3
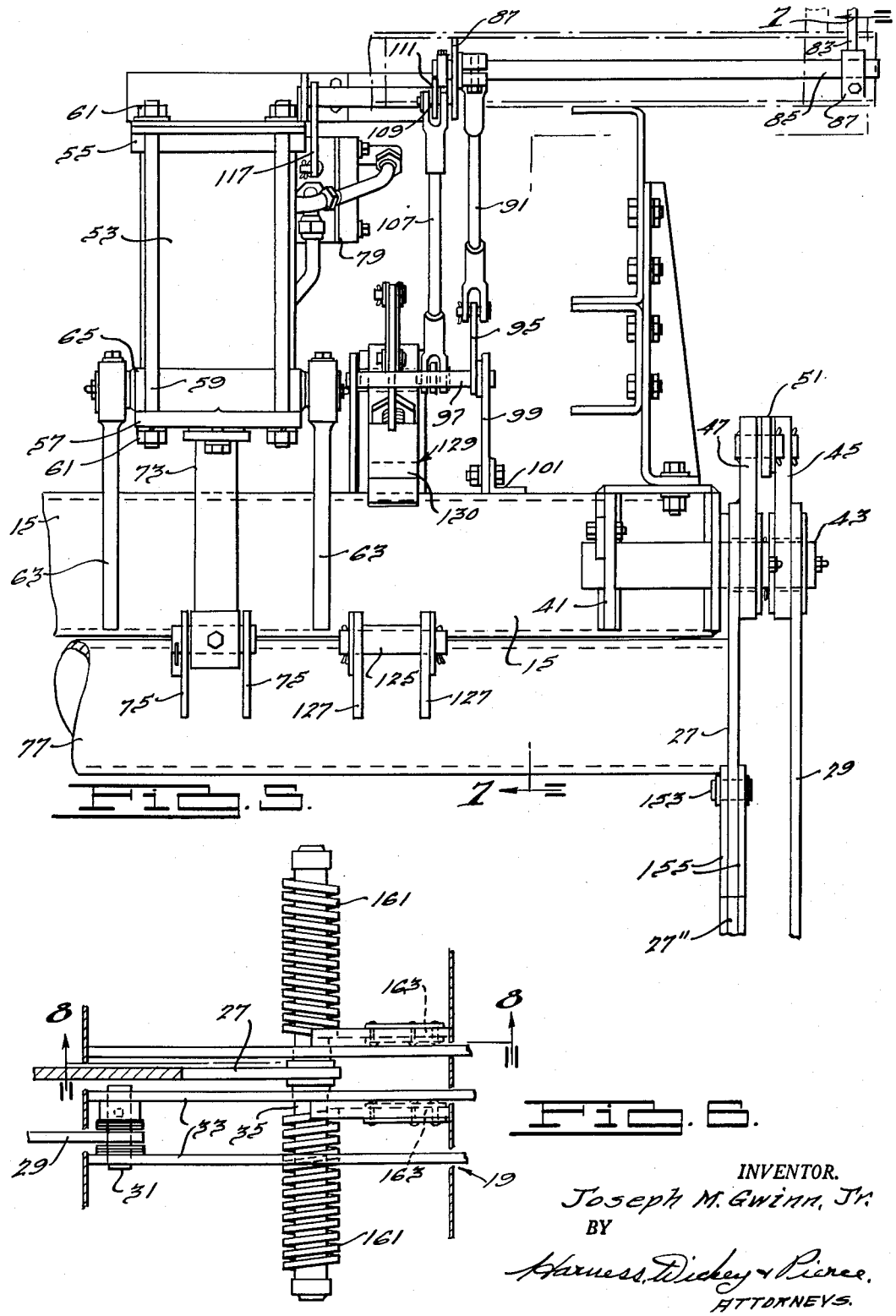
INVENTOR.
Joseph M. Gwinn, Jr.
BY
Harness, Dickey & Pierce
ATTORNEYS.

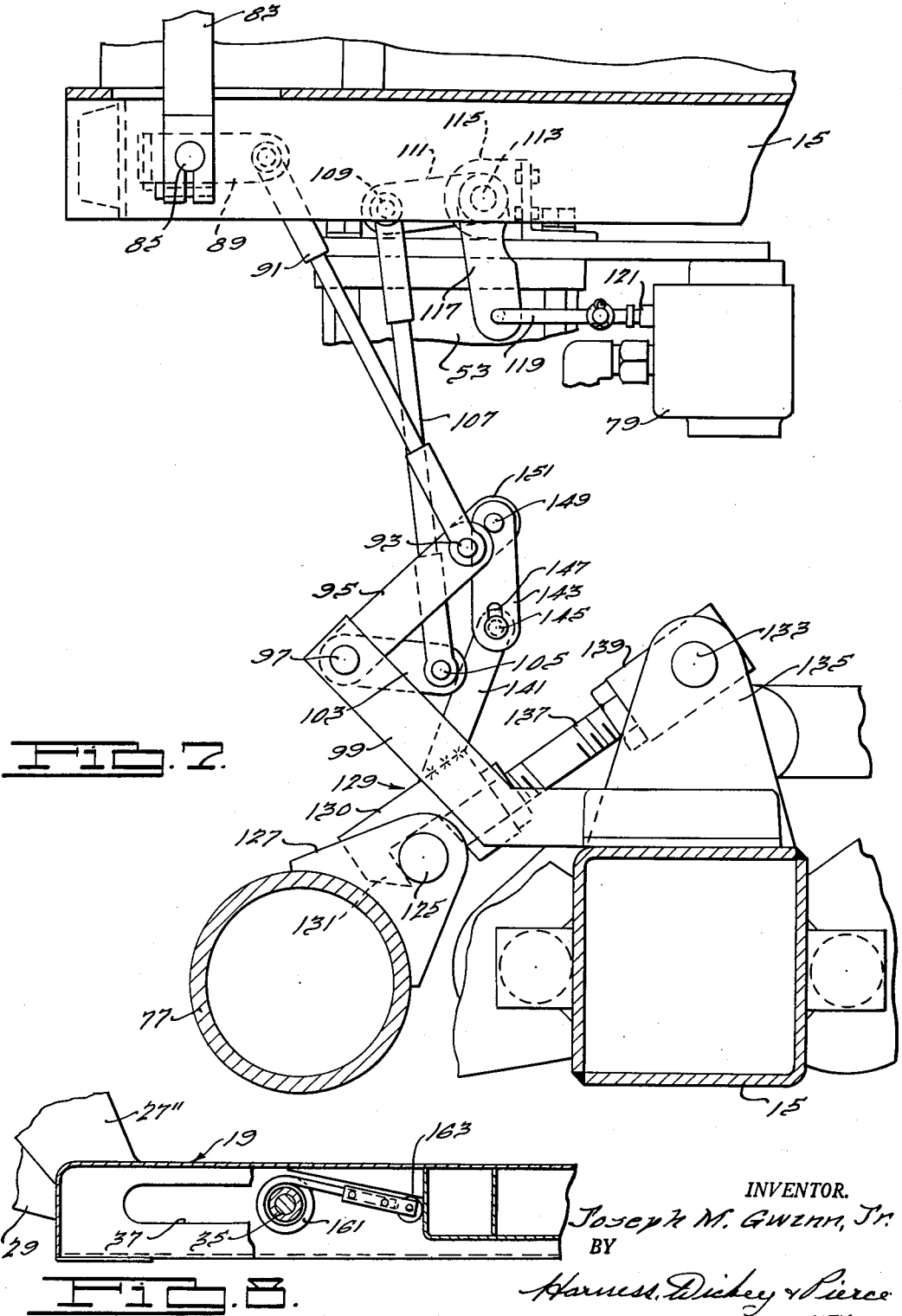

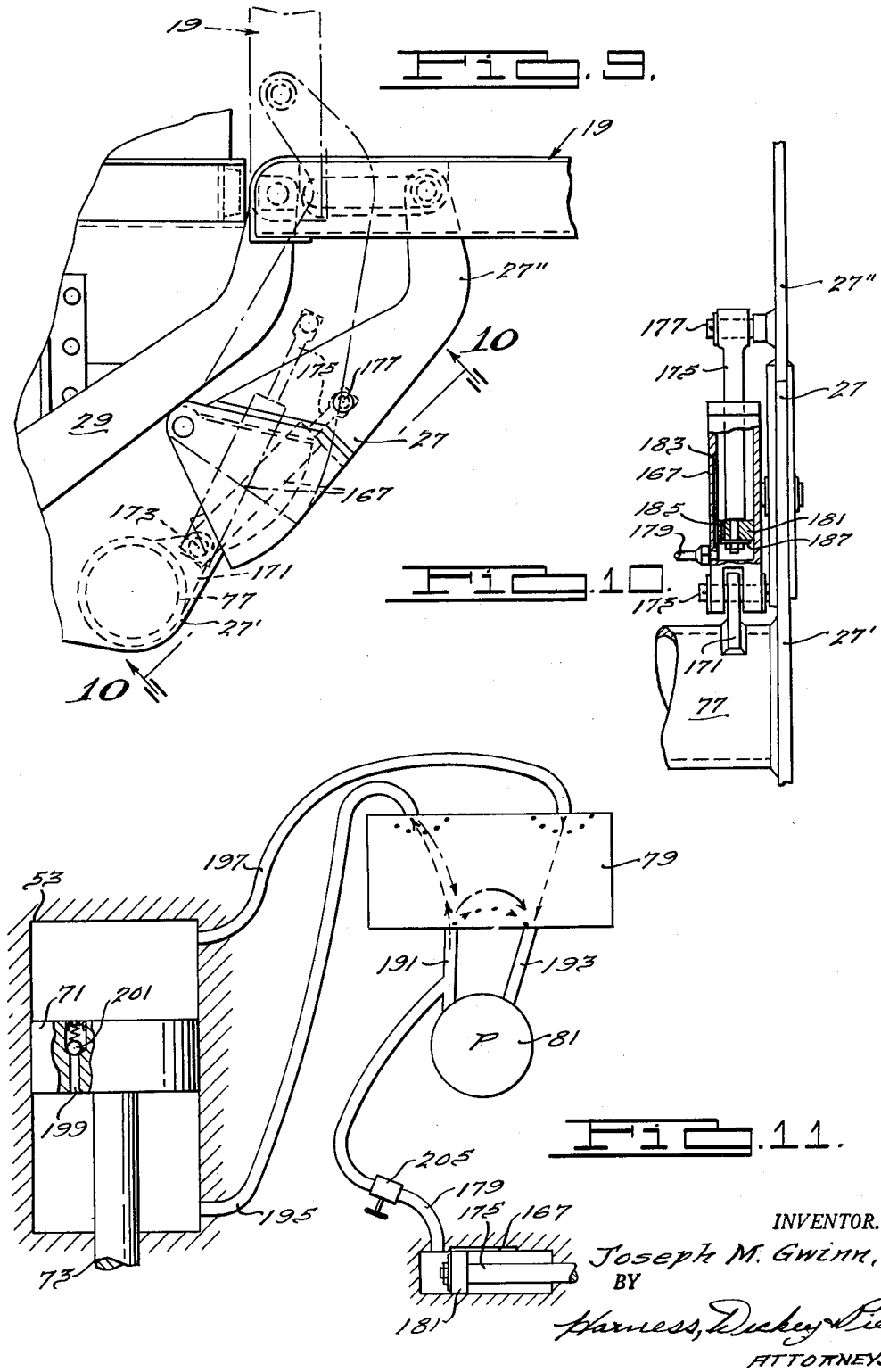

United States Patent Office 2,725,152
Patented Nov. 29, 1955

2,725,152

ELEVATING TAIL GATE FOR VEHICLES

Joseph M. Gwinn, Jr., Dearborn, Mich., assignor to Gar Wood Industries, Inc., Wayne, Mich., a corporation of Michigan Application September 13, 1951, Serial No. 246,443

7 Claims. (Cl. 214—77)

This invention relates to an elevating tail gate structure for vehicles.

It is an object of this invention to provide a novel elevating tail gate structure in which a combination load-carrying and tail gate member is supported and carried by an improved lifting arm arrangement so that bulky objects may be easily handled and loaded into or unloaded from a vehicle.

It is a further object of this invention to provide a structure of the aforementioned type, in which the lifting arm arrangement includes a pair of arms adjacent each side of the load-supporting member, which arms are connected with the member and with the vehicle to provide a parallelogram type lifting arm arrangement which will maintain the load-carrying member in a horizontal plane during its movement between a lowered position adjacent the ground and a raised position adjacent the floor of the truck body.

It is a still further object of this invention to provide a structure of the aforementioned type, in which the lifting arms are arranged and connected with the load-carrying member and the vehicle so that the stresses thereon are reduced to a minimum during the lifting operation.

It is a still further object of this invention to provide in a lifting arm arrangement of the aforementioned type, means for preventing the lifting arms from buckling as they pass over center relative to each other, so as to provide a stable parallelogram arm arrangement.

It is a still further object of this invention to provide a lifting arm arrangement of the aforementioned type, in which one arm of each pair is divided into separated hingedly interconnected portions so that the load-carrying member may be swung from its horizontal plane to a vertical tail gate position, in a simple and easy manner.

It is a still further object of this invention to provide simple and improved means for actuating and raising and lowering the lifting arm structure and the load-carrying member.

It is a still further object of this invention to provide means for either aiding in the manual closing of the tail gate or for closing the tail gate without any manual effort.

It is a still further object of this invention to provide a novel, hydraulic system or circuit for actuating and operating the elevating tail gate structure of this invention.

It is a still further object of this invention to provide a structure of the aforementioned type, including improved safety devices for preventing injury to an operator or loads being handled by the structure.

These and other objects of this invention will become apparent from the following detailed description, taken in conjunction with the accompanying drawings, in which:

Figure 1 is a perspective view of the elevating tail gate structure of this invention connected with the back end of a vehicle;

Fig. 2 is a side elevational view of the elevating tail gate structure of this invention connected with a vehicle and with the load-carrying member in its load position;

Fig. 5 is an end elevational view of the structure illustrated in Fig. 2;

Fig. 6 is an enlarged view, partially in section and partially in elevation, taken along the line 6—6 of Fig. 2;

Fig. 7 is a sectional view of the structure illustrated in Fig. 5, taken along the line 7—7 thereof;

Fig. 8 is a sectional view of the structure illustrated in Fig. 6, taken along the line 8—8 thereof;

Fig. 9 is a fragmentary, side elevational view of a further embodiment of the elevating tail gate structure of this invention, wherein a hydraulic mechanism is incorporated for swinging the load-carrying member from its horizontal to its vertical position;

Fig. 10 is a view, partially in section and partially in elevation, of the structure illustrated in Fig. 9, taken along the line 10—10 thereof;

Fig. 11 is a diagrammatic view of the operating hydraulic circuit employed for operating the elevating tail gate structure; and Fig. 12 is a side elevational view of a portion of the structure illustrated in Fig. 2, showing the parallelogram relationship of the lifting arms when the same pass over center relative to each other.

Figure 3:
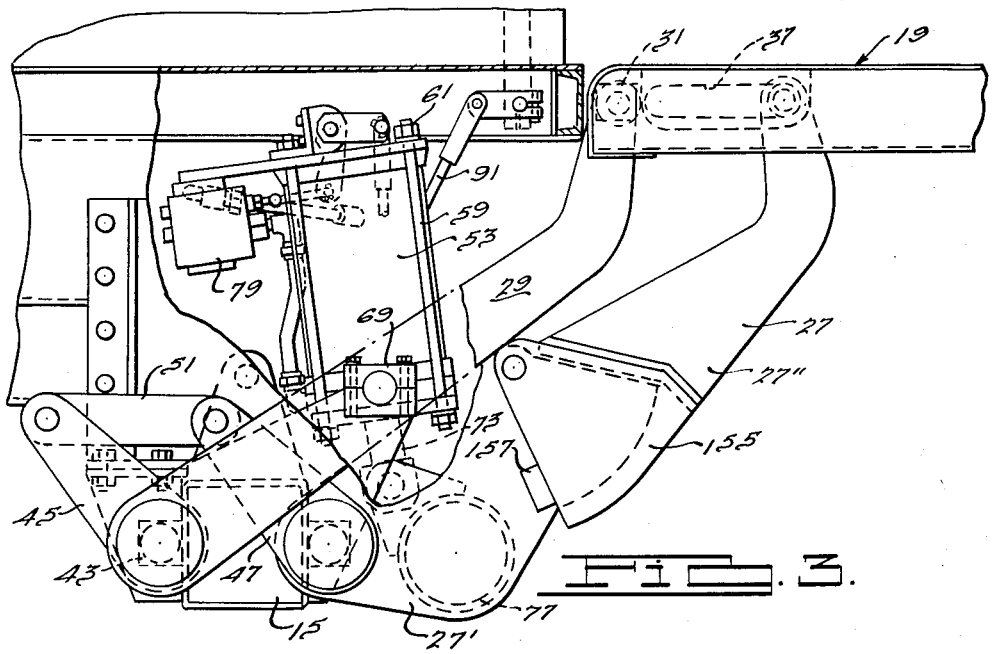
Fig. 3 is a view similar to Fig. 2, showing the load-carrying member in its raised horizontal position.
Figure 4:
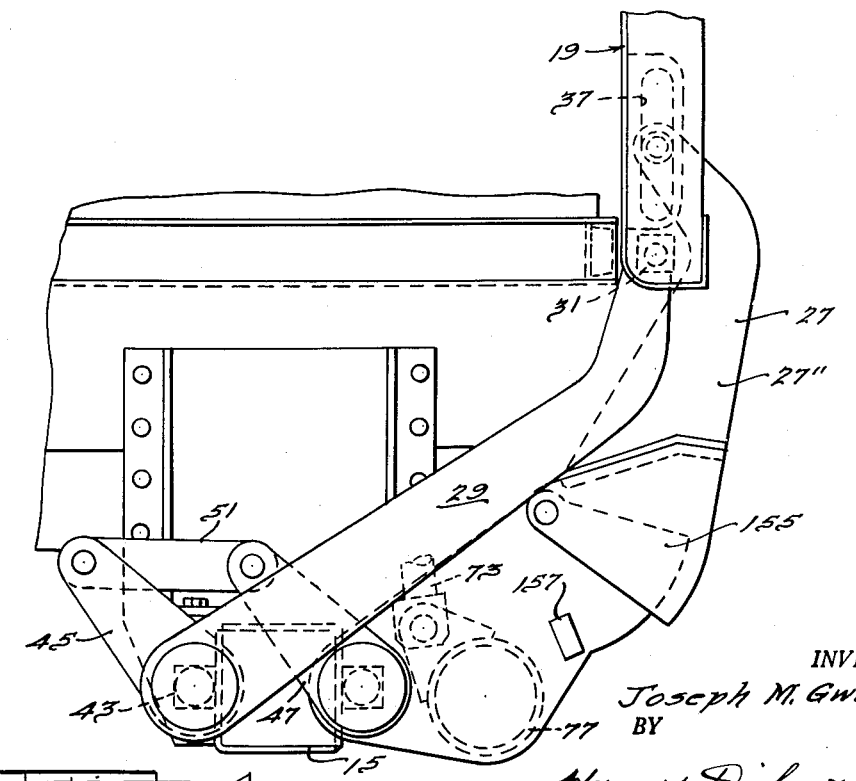
Fig. 4 is a side elevational view similar to Figs. 2 and 3, showing the structure of this invention when the load-carrying member is in its vertical tail gate position.

Referring now to the drawings, it will be seen that the elevating tail gate structure of this invention is indicated generally at 13 and is adapted to be connected to the frame 15 of a vehicle 17, generally of the truck type. Elevating tail gate structures are normally used in conjunction with trucks so that bulky objects need not be lifted manually into the body of the truck, but can be placed on a combination load-carrying and tail gate member 19, when the member is in its lowered position adjacent the ground, and moved into the truck by actuation of the load-carrying member, whereby the same is raised into alignment with the floor 21 of the vehicle and the objects may be slid or rolled from the load-carrying member into the truck. The combination load-carrying and tail gate member may thereafter be swung from a horizontal plane into a vertical position in which it acts as a tail gate to close the opening in the truck body, whether the same be at the side or rear of the truck.

The combination load carrying and tail gate member may be made in any suitable manner, but is illustrated as being made from high tensile steel reinforced with box type and V-bracing 23, with its outer or rear edge inclined at 25 to permit easy loading of material or objects onto the member. In order to guide the raising and lowering movement of member 19 an improved lifting arm arrangement is provided which includes a pair of lifting arms 27 and 29, adjacent each side of the member. Each of the lifting arms 29 has its lower or outer end journaled on a pin 31, which extends between and is supported by ribs 33 forming a part of member 19, adjacent the inner or front edge of the member 19. Each of the lifting arms 27 has its lower end journaled on a cross shaft 35 which is supported by ribs 33 and extends through elongated slots 37 in the ribs, disposed outwardly or rearwardly of the pin 31, so as to permit the cross shaft to move fore and aft relative to member 19 and thus provide a movable or lost motion connection. When the member 19 is disposed in a horizontal plane each cross shaft 35 engages the portion of its rib 33 defining the rear or outer end of its slot 37. It will also be noted that each lifting arm 27 lies in a plane disposed laterally inwardly from the plane of its lifting arm 29 so that the arms are out of interfering relationship with each other.

The upper or inner ends of the arms 29 are pivotally supported on opposite sides of the vehicle frame 15 by shafts or pins 39, which in turn are rigidly connected with the vehicle frame by suitable brackets 41. The arms 27 are similarly pivotally supported on opposite sides of the vehicle frame 15 by shafts 43 which are supported on the frame by the brackets. The distance between the axes of the shafts 43 and 39, on each side of the vehicle corresponds to the distance between the axes of the pins 31 and cross rods 35 on each side of member 19, when each cross shaft 35 is engaging the outer end of its rib slot 37. Therefore a parallelogram arm arrangement is provided for supporting and guiding the member 19 during its movement between its raised and lowered positions, so as to maintain the member in a horizontal plane during such travel. If a parallelogram type linkage were not employed, a much more complicated arrangement would be necessary to maintain the member 19 in a horizontal plane during such movement. With the aforementioned arrangement, wherein the outer ends of the arms are connected with the member 19, at horizontally spaced points, when the member 19 is in a horizontal plane, stresses on the arms are reduced to a minimum as compared with structures wherein the connections are vertically spaced. In such latter arrangements the arms are subjected to high stresses unless the connections are spaced apart a considerable distance. Due to the fact that the member 19 is relatively shallow in depth or thickness, such spacing cannot be practically obtained.

During the raising and lowering operations the lifting arms will pass over center relative to each other and the frame and member pivotal connections. That is, the lifting arms and their pivotal connections to both the vehicle and the member 19 will be disposed in a common horizontal plane, and when the arms reach such a position they will normally tend to buckle or move out of the parallelogram relationship, if means are not provided to maintain this relationship. In order to maintain this relationship, various means may be employed, but in the embodiment illustrated in the drawings a short link or arm 45 is journaled on each pin or shaft 39 and rigidly connected with each of the lifting arms 29, and a similar link or arm 47 is journaled on each pin or shaft 43 and rigidly connected with each lifting arm 27. The arms 45 and 47 extend parallel to each other and angularly from their lifting arms 29 and 27 so that they will not lie in a common horizontal plane at the same time that the lifting arms 27 and 29 and their pivotal connections are in a common plane. The upper or free ends of the arms 45 and 47 are interconnected by a link 51 so that the arms 45, 47, and link 51 cooperate to maintain the parallelogram arrangement of the lifting arms, even when the lifting arms are passing over center, and therefore positively prevent any buckling of the lifting arms during the raising or lowering movement.

In order to raise and lower the member 19 to any point between its position adjacent the ground and its position adjacent the truck floor 21, a hydraulic mechanism and operating structure is provided, which includes a hydraulic cylinder 53, which is supported on the vehicle frame 15 between the opposite pairs of lifting arms 27 and 29. The hydraulic cylinder 53 is supported between upper and lower supporting members 55 and 57 respectively, which are interconnected and clamped against the top and bottom of the cylinder by means of studs 59 and nuts 61. The lower supporting structure 57 is connected with and supported by the frame 15 through suitable brackets 63 on opposite sides thereof, and the upper ends of brackets 63 pivotally support a cross shaft 65, which in turn is rigidly connected with the supporting structure 57 by a clamp 69. The cylinder 53 can thus pivot about the axis of the shaft 65 relative to the vehicle frame 15, to accommodate the arcuate movement of the lifting arms 27 and 29, as will hereinafter appear. A piston 71 is disposed within the cylinder 53 and has a rod 73 projecting downwardly therefrom and beyond the confines of the cylinder. The lower end of the piston rod 73 is pivotally supported on brackets 75, which are rigidly connected with a transversely extending tubular member 77, which extends between and is rigidly connected with the lifting arms 27 on opposite sides of the vehicle. Therefore, when the piston 71 is moved upwardly in the cylinder 53, the piston rod 73 will raise the transverse member 77, which in turn will carry the lifting arms 27 and thus the lifting arms 29 and the member 19 upwardly, so as to move the member 19 from its lowered position to its raised position, while retaining the member in a horizontal plane. The reverse of the aforementioned movement takes place during the lowering operation of the member 19.

In order to control movement of the piston 71 within the cylinder 53, a valve 79 is provided which is adapted to be connected to a pump 81, which is shown in the diagrammatic view of the hydraulic circuit in Fig. 11 and which would normally be mounted on the vehicle and operated through the vehicle power take off, in a conventional manner which is not herein illustrated. While the structure of valve 79 will be hereinafter described, it will suffice at this time to point out that the valve is adapted to be shifted to any one of three different positions for controlling the elevating tail gate structure and the operation of the piston and cylinder unit, and that it is of the self-centering type so that if the operator releases the valve control lever the member 19 will stop and be retained at whatever position it is in when the lever is released. In order to shift the valve 79 a manually controllable linkage system is provided which includes a hand lever 83, disposed in a convenient position adjacent one side of the vehicle frame for operation by an operator. The hand lever 83 is connected with a transversely extending shaft 85 which in turn is journaled by brackets 87 on the vehicle frame 15.

As can be seen in Fig. 7, a rearwardly or outwardly projecting lever 89 is connected with the shaft 85, intermediate the ends thereof, and lever 89 in turn is pivotally connected with the upper end of a downwardly extending link 91. The lower end of the link 91 is pivotally connected at 93 with a rearwardly and downwardly extending lever 95, the lower end of which is rigidly connected with a transversely extending rock shaft 97. The rock shaft 97 is pivotally supported at its opposite ends by brackets 99, which in turn are rigidly connected with the vehicle frame 15 by brackets 101. A horizontally extending lever 103 is rigidly connected with the rock shaft 97 adjacent the lever 95 and its forward end is pivotally connected at 105 with the lower end of a rod member 107. The upper end of the rod member 107 is pivotally connected at 109 with the rear end of a link 111, the forward end of which is rigidly connected with a rock shaft 113 which is journaled on the vehicle frame 15 by brackets 115. The upper end of a link 117 is connected with the rock shaft 113 and the lower end thereof is connected with the rear end of a rod 119, the forward end of which is connected with the valve spool or element 121 of valve 79 for shifting the latter. Therefore, when the hand lever 83 is actuated the valve element 121 is shifted through the linkage mechanism previously described, to any one of three different positions, as will be hereinafter explained, for controlling the movement or actuation of the tail gate structure. It should also be noted that the axis of the shaft 97 corresponds with or is closely spaced relative to the axis of the cylinder supporting shaft 65, so that when the cylinder supporting shaft oscillates or rocks due to the arcuate movement of the lifting arms 27 and 29, movement will not be imparted back through the linkage to the hand lever 83 which movement, if it occurred, might change the setting of the valve when not desired.

In order to positively lock the lifting arms 27 and 29 in their upper position, and thereby prevent any accidental falling of the load-carrying member, if the hydraulic power source should fail, a mechanical latch is provided to secure the lifting arms in their fully raised position. This mechanical latch is automatically operated to hold the arms in their uppermost position through linkage connected with the hand lever 83 and the valve operating linkage. As can be best seen in Fig. 7, a transversely extending pin 125 is connected with the tubular member 77 by brackets 127, and the pin 125 is disposed normally above the tubular member 77. A latch 129 which includes a member 130 having a lip or projection 131 for engaging the under side of pin 125, is pivotally supported on the vehicle frame 15 at 133 by means of suitable brackets 135. The latch 129 includes an adjustable rod or stud 137, which has its opposite ends threadably connected with the latch element 130 and with member 139, which is pivotally supported at 133.

In order to control the movement of the latch 129 so that it will engage the pin 125 only when the arms are fully raised, a link 141 is welded to the upper face of the latch 129 and extends upwardly therefrom. The upper end of the link 141 is pivotally supported in the lower end of links 143 by means of a suitable pin 145, and the links 143 are slotted at 147 to permit the pin to slide vertically relative thereto. The upper ends of the links 143 are pivotally connected at 149 to the forward end of a link 151, which in turn has its lower and rear end rigidly connected with rock shaft 97.

Therefore, when the upper end of the hand lever 93 is moved toward the rear of the vehicle or to the left as viewed in Fig. 7, the rock shaft 97 will be rotated in a clockwise direction and will through the linkage move the valve element 121 toward the front of the vehicle or to the right to cause the piston to move upwardly in the cylinder. Simultaneously, this movement of the hand lever 83 will cause the links 143 to move downwardly, so that the latch 129 will pivot about the axis of pin 133, whereby the lip or projecting portion 131 of the latching element will move into latching position. When the lifting arms approach their uppermost position, pin 125 will engage the underside of latch element 130 and cam the same upwardly until the pin is above projecting portion 131, and then the latch element will move by gravity into engagement with the latch pin to mechanically and positively retain the lifting arms in their uppermost position. The slots 147 in links 143 provide a lost motion connection between links 143 and link 141, which permits the aforementioned camming action to take place. When it is desired to lower the lifting arms the hand lever 83 is moved to the left, as viewed in Fig. 7, and the reverse action takes place, whereby the latching element is moved out of engagement with the latch pin 125 and the valve element 121 is shifted so as to cause the piston to move downwardly in the cylinder, whereby the lifting arms will be lowered.

It will thus be seen that a simple mechanism is provided for raising and lowering the lifting arms, and that by simple manipulation of the hand lever 83 raising, lowering or holding of the lifting arms in any desired position can be achieved.

When the lifting arms are in their uppermost position the upper ends of the arms 29 abut the back of the vehicle frame 15 so that a slight gap exists between the front end of the load-carrying and tail gate member 19 and the back of the vehicle frame. This gap is desirable to permit the member 19 to be rotated about the axis of the shafts or pins 31 and moved from its horizontal position to its vertical tail gate position. At this time it should be pointed out that each of the lifting arms 27 are divided into separate portions 27' and 27" which portions are pivotally interconnected by a pivot pin 153. The upper end of each lower lifting arm portion 27" has welded thereto on opposite sides thereof, a pair of plates 155 and stop elements 157 are connected with each upper arm portion 27' adjacent the lower end thereof and are engaged by the plates 155 when each arm portion 27" is extended or in its normal lifting position. Thus, the stops 157 and the plates 155 cooperate to limit the relative pivotal movement between the arm portions in one direction and to provide a rigid arm during the raising and lowering of the load-carrying and tail gate member 19.

When it is desired to rotate or pivot the tail gate member 19 to its vertical or closed position, the operator merely pushes upwardly on the outer or rear end of the member 19, and the same will pivot or rotate about the axis of pins 31. During this rotation the cross shafts 35 which are connected with the arms 27 will slide forwardly in the slots 37 in ribs 33. Likewise, after the gate is swung partially upwardly, the arms 27 will break and the lower arm portions 27" will pivot about their pins 153 to permit the tail gate to be swung to its completely closed vertical position, in which it forms the tail gate for the truck opening. After the tail gate has been lifted and it is desired to retain the same in its vertical position, suitable chains or other fastening means may be employed to positively retain the tail gate in its closed position.

In the embodiment of the drawings illustrated in Figs. 6 and 8, the tail gate member 19 is adapted to be manually closed with the help of four helper springs 161, two adjacent each side of the member and connected with each cross shaft or rod 35. The outer end of each spring 161 is rigidly connected with the cross shaft 35, while the inner end of each spring extends rearwardly from the spring and carries a roller 163 thereon. The rollers 163 bear against the under side of the member 19 rearwardly of the cross shafts or rods. During the raising of the lifting arms, the springs 161 are tensioned or wound so that they tend to unwind and aid the operator in the raising of the tail gate member 19. Thus, the springs 161 provide a balanced tail gate which can be raised by an operator exerting only a relatively small amount of pressure or force against the underside of the tail gate.

In certain instances it may be desirable to provide means for hydraulically raising the tail gate member 19 from its horizontal position to its vertical tail gate position. In this event, and as shown in Figs. 9 and 10, hydraulic piston and cylinder units 167 are provided adjacent opposite sides of member 19. Each cylinder is pivotally connected at one end to the tubular member 77 by means of a suitable bracket 171, and pivot pin 173. The piston rod 175 which projects from the opposite end of each cylinder 167, is pivotally connected to the member 19 by means of a pivot pin 177 which is rigidly connected with the arm portion 27" so that movement of the piston rod outwardly will raise the arm portion 27" and thus the member 19 to its vertical position. While any suitable type of piston and cylinder unit may be employed, it is desirable that the final closing movement of the member 19 not to be too rapid. That is, it is not desired that the tail gate member slam against the back of the vehicle body, which might cause injury to an operator if he had his hands between the body and member. Therefore, in the illustrated embodiment each piston and cylinder unit is of the snubber displacement type in which fluid enters the forward end of the cylinder 167 through a conduit 179, so as to move the piston 181 to the right or outwardly. A slot 183 is milled in the interior wall of the cylinder and extends longitudinally toward the outer or opposite end of the cylinder The slot 183, however, terminates ahead of the outer end of the cylinder, so that fluid can not flow therethrough during the final movement of the piston toward the outer end of the cylinder. The piston 181 is provided with an orifice 185 therethrough, which is normally closed by means of a spring loaded disk 187. The piston and cylinder unit is of the displacement type so that when fluid enters the forward end of the cylinder through conduit 179 it moves piston 181 to the right and fluid in the outer end of the cylinder can flow through the fluid slot 183 to the opposite side of the piston. However, as the piston moves beyond the outer end of the slot 183 the fluid in the outer end of the cylinder can only flow through the orifice 185 in the piston and past the spring loaded disk 187. The orifice 185 and spring loaded disk are so calibrated as to snub or decrease the rate of movement of the piston so that while the tail gate will initially move toward its vertical position quite rapidly, its speed will be materially slowed during the last few inches of its travel, to prevent any accidents during the final stages of the gate closing operation.

As can be best seen in Fig. 11, the pump 81 in the hydraulic mechanism is connected with the valve 79 by means of conduits 191 and 193 so that the fluid flows from the pump 81 through the conduit 191 to the valve. The valve 79 is connected with the cylinder 53 by means of conduits 195 and 197. Conduit 195 connects the valve with the lower portion of the cylinder and is thus the high pressure conduit, while conduit 197 connects the valve with the top portion of the cylinder and carries hydraulic fluid from the cylinder to the valve. The piston 71 in cylinder 53 is provided with an aperture 199 therethrough, which is normally closed by a spring loaded check valve 201. When the lifting arms 27 and 29 are in their fully raised position, so that they engage the back of the vehicle frame 15 and cannot move any higher, the fluid pressure in the lower portion of the cylinder 53 will, of course, build up and the check valve will open when the desired operating pressure is exceeded, so that the fluid can flow through aperture 199 past the check valve 201 into the upper portion of the cylinder and thus through conduit 197. The upper portion of the cylinder 53, above the piston 71, acts as the fluid reservoir for the hydraulic system.

When it is desired to raise the lifting arms and thus the member 19, the pump 81 is operated from the vehicle engine through a suitable power take off mechanism, and the operator moves the hand lever 83 to the left, which shifts the valve element in valve 79 so that conduit 191 is connected through the valve 79 with conduit 195, as shown in dash lines in Fig. 11. Conduit 197 is connected through valve 79 with conduit 193, and the hydraulic fluid flows under pressure to the lower end of the cylinder 53 to move the piston 71 upwardly and the fluid in the upper portion of cylinder 53 flows therefrom through conduit 197, valve 79 and conduit 193, back to the pump. When the operator releases the hand lever 83, the valve element in valve 79 returns to its center position and fluid flows from the pump 81 through conduit 191, to the valve, and then directly back through conduit 193 to the pump as illustrated in dotted lines in Fig. 11. When the valve element is in its center position is closes conduits 195 and 197, so that the fluid therein and in cylinder 53 cannot flow, thus locking piston 71 and holding the same in cylinder 53 at the position it is in when the hand lever is released. Thus piston 71 and the lifting arms can be held in any desired position when the hand lever is released. When it is desired to lower the member 19, the hand lever 83 is moved to the right, which movement shifts the valve element in valve 79 to uncover and place in communication conduits 191, 193, 195 and 197. The hydraulic fluid is, therefore, circulated by pump 81 through conduit 191 into the valve 79, as illustrated in dot and dash lines in Fig. 11, and the fluid flows from the valve through conduit 193. As conduits 195 and 197 are uncovered, the piston 71 is free to float in the cylinder and the tail gate member 19 can move downwardly under the force of gravity.

When the hydraulic cylinders 167 are employed for closing the tail gate member 19, or moving the same from its horizontal to its vertical position, conduit 179 is connected with the pump conduit 191, previously described. A manually controlled valve 205 is connected in conduit 179, and when it is desired to close the tail gate member 19 valve 205 is opened and fluid flows from conduit 195 through conduit 179 and the valve 205 into cylinder 167, so as to move piston 181 outwardly, which movement causes the piston rod 175, which is connected with the lifting arms, to move the member 19 to its closed position. It will be appreciated that piston and cylinder unit 167 will operate to close the tail gate member 19 only when valve 79 is shifted to its position for supplying fluid under pressure to cylinder 53. Valve 205 is opened only after the lifting arms 27 and 29 have reached their upper position and check valve 201 is opened. Cylinder 167 is selected to be of a relatively small diameter in comparison with cylinder 53, so that a much lower force will be exerted on piston 181 than on the piston 71, whereby the tail gate member 19 cannot close or move from its horizontal to vertical position if the tail gate member is loaded or has objects positioned thereon. In other words, it would not be desirable to provide a system in which the operator could accidentally open valve 205 and have the tail gate move to its vertical position if the tail gate had not been cleared of any objects thereon, so the cylinder 167 is of a size to provide the desired closing force.

It will thus be seen that a novel, simple, hydraulic system is incorporated for operating the elevating tail gate structure, and it will furthermore be appreciated that the tail gate closing piston and cylinder units are connected into the hydraulic system for raising and lowering the lifting arms in a simple manner and in a manner which will prevent any accidental or undesirable closing of the tail gate member.

What is claimed is:

1. An elevating tail gate structure for vehicles, including a platform member adapted to be raised and lowered while disposed in a horizontal plane, and moved into a vertical plane so as to form a vehicle tail gate, a pair of pivotally mounted arms adjacent each side of said member and disposed in a parallelogram relationship, one arm of each of said pairs being articulately separated into inner and outer portions pivotally connected together, means pivotally connecting the other of each of said pair of arms to said member, means movably connecting the outer portion of each of said one arms to said member at a point spaced from said other arm pivotal connection for movement toward and away from said other arm pivotal connection in a direction substantially parallel to the plane of said platform member, and means connected to said arms for raising and lowering the same.

2. An elevating tail gate structure for vehicles including a platform member adapted to be raised and lowered while disposed in a horizontal plane and moved into a vertical plane so as to form a vehicle tail gate, a pair of spaced arms disposed adjacent each side of said member, horizontally aligned pivotal connections on each of said arms for connection with a vehicle, one arm of each of said pairs including articulately separated inner and outer portions, means pivotally interconnecting said portions so that when said platform member is moved from a horizontal plane to a vertical plane said arm portions can pivot relative to each other, means pivotally connecting the other arm of each of said pairs to said member, means pivotally connecting the outer portion of each of said one arms with said platform member at a point spaced from said other arm connection with said member for movement toward and away from said other arm connection in a direction substantially parallel to the plane of said platform member, the distance between said horizontally aligned pivotal connections corresponding with the distance between said member connecting points so that a parallelogram supporting arm arrangement is provided on each side of said member for controlling the raising and lowering movement thereof, an arm member connected with each of said horizontally aligned pivotal connections and extending angularly relative to said lifting arms, means interconnecting said arm members at points spaced from said horizontally aligned pivotal connections, whereby said arm members will maintain said lifting arms parallelogram arrangement when said lifting arms pass over center relative to each other, and means actuable to raise and lower said member.

3. An elevating tail gate structure for vehicles, including a combination tail gate and load-carrying member adapted to be moved between raised and lowered horizontal positions and a vertical closed position in which to form a tail gate for a vehicle, means for movably supporting said member on a vehicle, including a pair of spaced arms adjacent each side of said member, pivotal connections on said arms connecting the latter to said member at spaced horizontally aligned points and for connecting the arms to a vehicle at corresponding spaced horizontally aligned points so that said arms form a parallelogram-type movable supporting structure, one arm of each of said pairs including articulately separated inner and outer portions, means pivotally connecting said inner and outer portions intermediate the ends of the arms, means providing a movable connection between the outer portion of each of said one arms and said member so that said outer portions can move towards and away from the pivotal connection of the other arm with said member in a direction substantially parallel to the plane of said member during movement of said member from a horizontal plane to a vertical plane, means connected with said movable supporting means to raise and lower said member, and co-operating means on said inner and outer arm portions engageable to limit the pivotal movement between said inner and outer portions in one direction.

4. An elevating tail gate structure for vehicles, including a combination tail gate and load-carrying supporting member adapted to be raised and lowered while disposed in a horizontal plane and adapted to be moved into a vertical plane so as to form a vehicle tail gate, means for movably supporting said member on a vehicle, including a pair of spaced generally parallel arms disposed adjacent each side of said member, pivotal connections on each of said arms for connection with a vehicle, means pivotally connecting the arms of each of said pairs with said member at horizontally spaced points when said member is disposed in a horizontal plane, the distance between said pivotal connections corresponding with the distance between said member connecting points so that a parallelogram supporting arm arrangement is provided on each side of said member for controlling the raising and lowering movement thereof, means actuable to raise and lower said member, means providing a movable connection between the pivotal connection of one arm of each of said pairs and said member and permitting movement thereof towards and away from the pivotal connection of the other arm and said member in a direction substantially parallel to the plane of said member, said one arm of each pair including articulately separated inner and outer portions, and means interconnecting said inner and outer portions so that when said member is moved from a horizontal plane to a vertical plane said inner and outer portions can move relative to each other.

5. An elevating tail gate structure for vehicles, including a combination tail gate and load-supporting member adapted to be raised and lowered while disposed in a horizontal plane and adapted to be moved into a vertical plane so as to form a vehicle tail gate, means for movably supporting said member on a vehicle, including a pair of spaced generally parallel arms disposed adjacent each side of said member, pivotal connections on each of said arms for connection with a vehicle, means pivotally connecting the arms of each of said pairs with said member at horizontally spaced points when said member is disposed in a horizontal plane, the distance between said pivotal connections corresponding with the distance between said member connecting points so that a parallelogram supporting arm arrangement is provided on each side of said member for controlling the raising and lowering movement thereof, means actuatable to raise and lower said member, means providing a movable connection between one arm of each of said pairs and said member, said one arm of each pair including separate portions, means pivotally interconnecting said portions so that when the member is moved from a horizontal plane to a vertical plane said arm portions can pivot relative to each other, and means connected with said arms for maintaining said parallelogram arrangement when said points of connection with said member and said pivotal connections are disposed in a common plane.

6. An elevating tail gate structure for vehicles including a platform member adapted to be raised and lowered while disposed in a horizontal plane, and moved into a vertical plane so as to form a vehicle tail gate, means for movably supporting said platform member on a vehicle, including a pair of generally parallel arms disposed adjacent each side of said member, means connecting said arms with said member to permit said member to pivot relative thereto, a hydraulic piston and cylinder unit connectible with the vehicle and connected with said arms for raising and lowering the same, pump means for actuating the piston within the cylinder, conduit means connecting said pump means with one end of said cylinder for carrying fluid to said cylinder to raise said piston and thus said arms, a second piston and cylinder unit, means connecting said piston and cylinder unit with one of said arms and with said member so that relative movement between said piston and cylinder in one direction will cause said member to pivot relative to said arms, conduit means connected with one end of said cylinder and with said pump conduit means for carrying hydraulic fluid to said cylinder, valve means connected between said pump means and said arms piston and cylinder unit, and including a manually shiftable element adapted to control the flow of fluid from the pump to the cylinder, second valve means connected with said second piston and cylinder unit conduit means and actuable to control the flow of fluid to said cylinder, whereby said second valve means may be actuated to permit fluid to flow to said second piston and cylinder unit to cause closing of said member.

7. An elevating tail gate structure for vehicles including a platform member movable in a horizontal plane between raised and lowered positions and movable from a horizontal plane to a vertical plane, a pair of arms connected with said member adjacent opposite sides thereof and connectable to a vehicle for controlling the raising and lowering movement of said platform member, one arm of each of said pairs including a portion connected with said member and pivotally connected with another portion of said arm, a piston and cylinder unit connectable to said vehicle and connected with said arms for raising and lowering the latter, pump means operatively connected with said piston and cylinder unit for supplying hydraulic fluid thereto to actuate the same, means for selectively controlling the flow of hydraulic fluid from said pump to said piston and cylinder unit, a hydraulic mechanism connected between said member connected arm portion and said other arm portion actuable to cause said member connected arm portion and said platform member to move relative to said arms from a horizontal to a vertical position, means connecting said hydraulic mechanism with said pump for supplying fluid to said hydraulic mechanism, and means operative to control the flow of fluid from said pump means to said hydraulic mechanism and thereby control the movement of said member relative to said arms.

References Cited in the file of this patent

UNITED STATES PATENTS

| 1,113,191 | Breese, Jr. | Oct. 13, 1914 |
| 1,141,928 | Brown | June 8, 1915 |

(Other references on following page)

UNITED STATES PATENTS

| | | |
|---|---|---|
| 2,075,954 | Osgood | Apr. 6, 1937 |
| 2,230,014 | Raven | Jan. 28, 1941 |
| 2,456,805 | Wohlforth | Dec. 21, 1948 |
| 2,466,155 | Conrad | Apr. 5, 1949 |
| 2,480,528 | Wachter | Aug. 30, 1949 |
| 2,525,424 | Novotney | Oct. 10, 1950 |
| 2,576,881 | Kern | Nov. 27, 1951 |
| 2,593,240 | Anthony et al. | Apr. 15, 1952 |
| 2,603,454 | Newton et al. | July 15, 1952 |
| 2,624,477 | Messick | Jan. 6, 1953 |
| 2,626,067 | Berford et al. | Jan. 20, 1953 |
| 2,683,539 | Corley, Jr. | Juyy 13, 1954 |
| 2,683,545 | Wood | July 13, 1954 |